US007000389B2

(12) United States Patent
Lewellin (10) Patent No.: US 7,000,389 B2
(45) Date of Patent: Feb. 21, 2006

(54) ENGINE FOR CONVERTING THERMAL ENERGY TO STORED ENERGY (76) Inventor: Richard Laurance Lewellin, 8 Somerville Crescent, Somerville, Victoria 3912 (AU)

( * ) Notice: Subject to any disclaimer, the term of this patent is extended or adjusted under 35 U.S.C. 154(b) by 0 days.

(21) Appl. No.: 10/509,010

(22) PCT Filed: Mar. 27, 2003

(86) PCT No.: PCT/AU03/00380

§ 371 (c)(1),
(2), (4) Date: Sep. 24, 2004

(87) PCT Pub. No.: WO03/081011

PCT Pub. Date: Oct. 2, 2003

(65) Prior Publication Data
US 2005/0155347 A1    Jul. 21, 2005

(30) Foreign Application Priority Data
Mar. 27, 2002 (AU) .................................. PS1382

(51) Int. Cl.
F01B 1/00 (2006.01)
(52) U.S. Cl. ..................... 60/512; 60/508; 60/515
(58) Field of Classification Search .................. 60/517, 60/520, 521, 522, 524, 508, 512, 515
See application file for complete search history.

(56) References Cited

U.S. PATENT DOCUMENTS 3,788,088 A * 1/1974 Dehne ............................ 62/6
4,270,350 A   6/1981 Chevalier
4,345,437 A   8/1982 Dineen
4,350,012 A   9/1982 Folsom et al.
4,418,547 A * 12/1983 Clark, Jr. ...................... 62/116
4,450,690 A *  5/1984 Clark, Jr. ...................... 62/116
4,498,302 A   2/1985 Djelouah
4,617,801 A  10/1986 Clark, Jr.
5,345,769 A *  9/1994 Liepert et al. .................. 62/6
5,927,080 A *  7/1999 Lee ................................ 62/6
6,250,078 B1 * 6/2001 Amendola et al. ............ 60/509

FOREIGN PATENT DOCUMENTS

EP    0 178 348       4/1986
WO    WO 82/00319    2/1982
WO    WO 83/04281   12/1983
WO    WO 87/03357    6/1987

OTHER PUBLICATIONS

PCT International Search Report, PCT/AU03/00380, dated Apr. 30, 2003.
PCT International Preliminary Examination Report, PCT/AU03/00380, dated Jun. 3, 2004.

* cited by examiner

Primary Examiner—Hoang Nguyen
(74) Attorney, Agent, or Firm—TraskBritt (57) ABSTRACT The engine for converting thermal energy to stored fluid energy includes expansion cylinders (61a–f) with expansion chambers (62a–f) and flexible membranes (63a–f). Heating and cooling of working fluid inside the cylinders (61a–f) is carried out by fluid supply lines (73, 71) communicating with external heat resources and sinks. Pressure accumulator (66a) is adapted to store a pressurised fluid (64a–f), such as hydraulic oil, from the individual cylinders (61a–f). In use, this pressurised fluid is delivered at an elevated and above a minimum threshold pressure level, irrespective of the irregularities of the movement of the expansion cylinders (61a–f).

20 Claims, 8 Drawing Sheets

ENGINE FOR CONVERTING THERMAL ENERGY TO STORED ENERGY

FIELD OF INVENTION

This invention relates to an engine for converting thermal energy to stored energy.

BACKGROUND ART

Methods of performing useful work by utilising sources of heat that are external to a working apparatus have been described. However, there are available sources of heat energy that have either not been effectively utilised to perform useful work.

It would be desirable to use relatively low temperature sources of heat energy or to utilise heat energy from sources that is presently being wasted. However, it will be appreciated that the invention is not limited to energy sources of low temperature. Fluid with temperatures of up to 100° C. and beyond could be utilised by the invention. The temperature of the energy source may determine the type of thermal energy converter, such as all whether an evaporator or condensor may be used.

For example, solar radiation can be used to readily heat water to modest temperatures such as 40° C.–60° C. and it would be advantageous if such heat energy could be used to perform useful work. Heated water or heated water vapour can be obtained from hydrothermal sources. For example, bore water extracted from ground aquifers and used for irrigation or for drinking water for stock or for domestic use in remote locations is often at all elevated temperature and it would be beneficial if the heat energy of such water could be reduced and utilised to perform useful work. Also there are many possible sources of heat energy that are presently unutilised or underutilised such as heat energy in exhaust gases or particles such as smoke: (a) from internal combustion engines, such as engines driving generators or even being used in vehicles and (b) discharged from industrial plant and equipment.

STATEMENT OF INVENTION

An engine for converting thermal energy to stored energy, the engine including:
(a) a thermal energy converter including an expansion chamber which is adapted to vary in volume by the movement of a movable wall forming one part of the expansion chamber, the expansion chamber capable of performing an expansion-contraction cycle;
(b) a working fluid in the expansion chamber which expands upon being heated whereby to displace the movable wall in a first direction to expand the volume of the expansion chamber and contracts upon being cooled to displace the movable wall in an opposed direction to reduce the volume of the expansion chamber;
(c) a temperature modifier adapted to draw on:
(i) a heat source to heat the working fluid to expand the volume of the expansion chamber by the displacement of the expansion wall to increase the volume of the expansion chamber as a first expansion past of the cycle; and
(ii) a cooling source to cool the working fluid to reduce the volume of the expansion chamber and to peat the return of the movable wall as a second part of the cycle; and
(d) pressure storage means operatively associated with the movable wall and adapted to deliver pressurised fluid to an accumulator means, the accumulator means for storing the pressurised fluid at an elevated pressure, wherein the accumulator means is capable of being bled of the pressurised fluid at a predetermined rate such that the accumulated the elevated pressure is maintained at a minimum threshold level, irrespective of the irregularity of the movement of the removable wall.

The heat source may be an external source of fluid with a temperature above 39 C. The external source of fluid may be a by-product or waste product of an industrial or mechanical process. The regularity and speed of the movement of the movable wall may be influenced by the difference between the temperatures of the heating and cooling sources and the stage of the cycle. A first predetermined dwell time may precede each expansion part of the cycle. A second predetermined dwell time may precede each contraction part of the cycle. The pressure storage means may include a storage piston operatively coupled to the movable wall and may further include pressure intensification means whereby the surface area of the movable wail is greater than the surface area of the storage piston.

The engine may include a plurality of thermal energy converters arranged in parallel to charge the accumulator means with the pressurised fluid. The plurality of thermal energy converters may operate independently of one another. The operation of the plurality of thermal energy converters may be coordinated to deliver a relatively consistent supply of pressurised fluid to the accumulator means. The plurality of thermal energy converters may be controlled by pressure switch means to determine selectively the heating or cooling of the working fluid. Each the movable wall of the plurality of thermal energy converters may be in the form of a converter piston and may be mechanically linked by a rocker arrangement to determine selectively the heating or cooling of the working fluid.

The heating and cooling sources may be sources of hot and cold fluid, respectively, and the delivery of the hot and cold fluid to the plurality of thermal energy converters may be controlled by valve switching mean to determine selectively the heating or cooling of the working fluid in each the converter.

The engine may be adapted to power work output means by the process of bleeding the pressurized fluid to drive a generator or an alternator. The alternator may generate alternating current suitable for powering work output means in the form of appliances adapted to be powered by mains electricity.

According to another aspect there is provided an engine including:
(a) an expansion chamber having a movable wall so that the chamber has a variable volume, the chamber containing a working fluid which increases in pressure and expands upon being heated by an external heat source so as to move the wall upon being heated and increase the volume of the chamber and conversely which contracts upon being cooled so that the wall moves in the opposite direction to decrease the volume of the chamber;
(b) pressure storage means, wherein the wall is operative to charge the pressure storage means whereby to convert the kinetic energy of the movable wall, to stored energy in the pressure storage means; and
(c) controlled work output means, wherein the engine is adapted to to provide a constant power supply to the controlled work output means, irrespective of the irregularity of the movement of the movable wall.

The expansion chamber may include a cylinder having a piston movable therein, the piston defining the movable wall of the chamber. Alternatively, the movable wall may be a diaphragm or other flexible membrane adapted to expand the expansion chamber with the expansion of the working fluid.

The working fluid preferably has a high thermal expansion co-efficient. The working fluid may be a gas or liquid. Preferably the working fluid is a Liquid. Even more preferably, the liquid is a refrigerant. The working fluid may be any suitable material such as a refrigerant of the kind used in refrigeration and air conditioning plant, e.g. freon gases, ammonia, isopentanes, AZ20 etc.

The engine may include fluid heating means for applying heat from the external source to the working fluid during a heating cycle of the engine so as to cause the working fluid to expand in the expansion chamber. The engine may include fluid cooling means for cooling the working fluid during a cooling cycle commencing after the heating cycle 90 as to cause contraction of the working fluid in the expansion chamber.

The fluid heating means and fluid cooling means may include a heat exchanger for supplying heat energy to the working fluid and for extracting heat energy from the working fluid, respectively. The heat exchanger may be provided with heat energy from the external source during the heating cycle, e.g. by being supplied with heated water from solar heat collectors or by thermal ground water or directly or indirectly with heat from a source of waste heat energy. Conversely during the cooling cycle, the heat exchanger may be supplied with a cooling medium such as surface water from any convenient local source.

The engine may include control means for cycling the fluid heating means and fluid cooling means alternately so as to alternately heat and cool the working fluid and cause reciprocating motion of the movable wall of the expansion chamber. The control means may switch the supplies of heating medium and cooling medium to the fluid heating means and the fluid cooling means in alternating fashion synchronised with, e.g. in response to, the movement of the movable wall of the expansion chamber reaching predetermined points in its reciprocating movements.

The pressure storage means may be operatively associated with the movable wall of the expansion chamber. It may include compression means coupled to the movable wall for compressing a storage fluid during one of the cycles of the movable wall. It may include accumulator means for holding pressurised storage fluid at an elevated pressure and at progressively increasing pressure as the compression means cycles in response to cyclical movement of the movable wall of the expansion chamber. Because the accumulator means stores pressurised storage fluid at an elevated pressure, it is capable of performing useful work. The accumulator means may be operatively associated with the controlled work output means to utilise the stored pressurised storage fluid to perform useful work by bleeding out the pressurised storage fluid at a controlled rate.

The compression means of the pressure storage means may comprise a movable member such as a compression piston or a flexible member such as a diaphragm movable within a cylinder. Where the movable wall and the movable member are both pistons, preferably the movable member is substantially smaller in diameter to the movable wall. The effect of the step down ratio of piston areas is that the working fluid pressure developed in the expansion chamber is magnified in the pressure storage means. The compression piston movable in the compression chamber in response to movement of the movable wall of the expansion chamber, compresses the storage fluid. The storage fluid being compressed by the compression means can be supplied to the accumulator means so as to progressively increase the pressure and volume of the fluid held by the accumulator means.

In an alternative arrangement the pressure storage means may form part of the expansion chamber. The movable wall may separate the working fluid on one side from the storage fluid on the other. The movable wall may be flexible as in a diaphragm, or may be in the form of a piston. The engine may include a battery of expansion chambers in parallel all adapted to charge the pressure storage means with pressurised storage fluid. The pressure storage means may include a movable member that separates the pressure storage fluid from a counter pressure means, such as a compression spring or a compressible gas. In the case of a compressible gas, this may be any suitable gas, preferably non-ignitable, for example, nitrogen or carbon dioxide.

The storage or pressurised fluid may be an oil and the accumulator means may include one or more oil accumulators of generally known type used for storing hydraulic oil at elevated pressure for subsequent controlled release.

The controlled work output system may, for example, include an hydraulic motor through which the pressurised stored hydraulic oil can be released in a controlled manner so that the hydraulic motor can perform useful work. The hydraulic motor may be used to directly power a hydraulic machine. For example, the work output system may include a rock crusher used in the mining industry or other heavy hydraulic machinery. Normally such hydraulic machines require a costly heavy duty electric motor such as a 400–500 h.p. motor to operate effectively. The work output system may be coupled to an alternator or generator to produce electrical energy for direct utilisation or for charging storage batteries. The storage fluid, which in the preferred embodiment is hydraulic oil, can be returned after being released from the hydraulic oil accumulator means, through the hydraulic motor, to a reservoir. The storage fluid held at low pressure in the reservoir can be progressively drawn into the compression means during a return-stroke of the compression piston, whereas during the compression stroke of the compression means the supply line to the reservoir is closed and the hydraulic oil being compressed is supplied to the oil accumulator means.

In another aspect there is provided an engine for converting thermal energy to stored energy for doing work the engine including:

(a) a thermal energy converter including an expansion chamber which is adapted to vary in volume by the movement of a movable wall forming one pant of the expansion chamber, the movable wall capable of performing an expansion-contraction cycle;

(b) a working fluid in said converter compartment which expands upon being heated and contracts upon being cooled whereby to displace the movable wall;

(c) a temperature modifier:

(i) to heat the working fluid to expand the volume of the expansion chamber by the displacement of the expansion wall as a first expansion part of the cycle; and subsequently, (ii) to cool the working fluid to reduce the volume of the expansion chamber and to permit the return of the movable wall as a second part of the cycle;

(d) pressure storage means operatively associated with the movable wall and adapted to deliver pressurised fluid to an accumulator;
(e) said accumulator for storing the pressurised fluid at an elevated pressure; and
(f) controlled work output means for converting the energy associated with the pressurised storage fluid to a useful form,
wherein the engine is adapted to to provide a constant energy supply to the controlled work output means, irrespective of the irregularity of the movement of the movable wall.

Whether the movable ball is in the form of a flexible membrane, a rigid, axially displaceable member such as a piston or some other arrangement such as a hinged member, the expansion/contraction cycle may be described as a stroke cycle from the beginning of the expansion of the expansion chamber, to its return to the minimal volume.

The controlled work output means is preferably capable of energy conversion at a constant rate, preferably irrespective of the rate of the stroke cycle or of the rate of the first or second part of the stroke cycle. For example, the cycle of the movable wall may be irregular such that stroke cycles may vary in the total time required to complete a cycle. Moreover, the actual stroke of the movable wall may be of non-uniform speed. Indeed, typically there is resistance to the travel of the movable wall during the first part of the stroke cycle and that resistance is variable over time. The movable wall may accelerate during its travel through the stroke as the resistance dissipates. On the other hand, where there is little or no resistance to the travel of the movable wall during the stroke such as where an opposed compartment of the expansion chamber is vented to the atmosphere, the movable wall may be subject to high initial acceleration, followed by steady deceleration as the expansion chamber expands, thereby effectively decreasing the pressure in the expansion chamber. Irrespective of the rate of the stoke cycle, however, the pressure storage means may be effective to ensure delivery of sufficient pressurised fluid to the accumulator means to enable the accumulator means to supply the controlled work output means with energy at a constant rate, if required.

The engine may include a converter including the expansion chamber on one side of the movable wall and an opposed compartment on its other side. The opposed compartment may be of variable volume. Preferably the converter as a whole defines a chamber with a constant volume such that the variable volume of the expansion chamber is in inverse relationship to the volume of the opposed compartment.

The pressure storage means may include a hydraulic or pneumatic arrangement, preferably a hydraulic arrangement.

The engine may include pressure intensification means. In the pressure intensification means the opposed compartment may contain at least some of the pressurised fluid. The movable wall may include a first face in part defining the expansion chamber and a second face in part defining the opposed compartment. The first face may be significantly greater in surface area than the second face to achieve the pressure intensification desired between the expansion chamber and the pressure intensification means. The available volume to the pressurised fluid in the opposed compartment may be reduced by the presence of a column occupying space between the second face and an aperture in the end wall of the opposed compartment through which the column may extent. The column may be any suitable configuration or orientation within the opposed compartment, provided that it has a constant cross-section throughout its length or the section of length adapted to travel through the aperture.

In another arrangement, the intensification chamber may be separate from the expansion chamber and the intensification chamber may house an intensification wall which may vary in construction in a manner similar to the movable wall. The intensification wall may be movable to define an intensification chamber compartment of variable volume. The intensification wall may be operatively associated with the movable wall. In order to obtain the pressure intensification desired between the expansion chamber and the pressure intensification means, the surface area of the movable wall may be significantly larger than the surface area of the pressure chamber wall facing the pressurised fluid. The movable wall and the intensification wall may be connected by a common shaft extending through the opposed compartment and into the intensification chamber. The intensification chamber may include the pressure intensification means.

The intensification compartment may be selectively in communication with the accumulator means, whereby to provide the pressurised fluid to the accumulator at elevated pressures. Interposed in communication lines between the intensification compartment and the accumulator may be a valve or a combination of valves. The combination of valves may include a first one way outlet valve permitting delivery of pressurised fluid to the accumulator on completion of each stroke or part thereof. The combination of valves may also include a one-way inlet valve to permit return of recycled non-pressurised fluid formerly used when pressurised to power the work output means. The intensification compartment, the accumulator and the work output means may form a closed system in which the pressurised fluid is recycled as non-pressurised fluid to the intensification compartment.

The one or more valves may be spring loaded ball and socket valves as is standard in the art or may comprise any other suitable valve arrangement effective to perform the required valve functions.

The intensification chamber may further include an opposed intensification compartment on an opposite side of the intensification wall. The opposed intensification compartment may be vented to the atmosphere whereby to provide little resistance to the intensification wall during a stroke cycle. Alternatively, the opposed intensification compartment may be in communication with a collector vessel whereby any leakage through seals and the like associated with the intensification wall may be fed back into a closed system.

The pressure intensification means may include return means for urging the intensification wall and thus the movable wall back to a return position during the second part of the stroke cycle. The return means may include a spring. Alternatively, the return means may include a return chamber containing, for example, a gas which provides ever increasing resistance as the gas is compressed by a return piston. The return piston may be operatively associated with the movable wail and the intensification wall, for example by means of a coaxial shaft. An opposed return compartment on the other side of the return piston wall may be vented to the atmosphere.

The accumulator means may include one or more closed containers for housing the pressurised fluid at elevated pressures. The pressurised fluid may be non-compressible. For example, the pressurised fluid may be hydraulic oil. Each of the closed containers may include a movable accumulator wall, for example in the form of a piston or a flexible membrane. Together with the accumulator wall, the containers may define a closed compressible fluid compartment of variable volume. Accordingly, each container may define a compressible fluid compartment and a non-compressible fluid compartment. The non-impressible fluid compartment may be in communication with the work output means.

The non-compressible fluid may be bled at a regular rate from the non-compressible fluid compartment at elevated pressure to drive the work output means. Alternatively, the work output means coupled to the accumulator may be selectively operable, intermittently operable or programmably operable whereby to bleed off pressurised fluid at a predetermined or required time and rate.

The work output means may generate electricity. For example, the work output means may drive an alternator operating, for example, at 1500 r.p.m. to generate the equivalent of mains power at 50 Hz to a reliablity of say +/−2%. The work output means may act as a pump for other fluids, such as water required for domestic or irrigation purposes or sewage effluent. The work output means may include an alternator or a generator. The work output means may charge a battery whereby to store electrical energy.

The engine may include a second expansion chamber. The second expansion chamber may be operatively associated with the first expansion chamber. The second expansion chamber may include a second movable wall. The second movable wall may be operatively associated with the first movable wall. For example, the second movable wall may include a piston having a second shaft. The second shaft may be operatively connected to the first shaft adapted to reciprocate along an axis coaxial with the first movable wall. The first and second shafts may be connected by means of a rocker arrangement. The first and second shafts may be so arranged as to reciprocate in opposites directions. The first part of the stroke cycle of the first movable wall may correspond to a second complementary part of the stroke cycle of the second movable wall.

The rocker arrangement may include locking means to provide a dwell time in which the first expansion chamber may accumulate pressure and the first opposed compartment may dissipate pressure to maximise the power of the stroke of the first movable wall. The first expansion chamber may pressurise at the same time as the second opposed compartment pressurises whilst the first opposed compartment and the second expansion chamber are subject to dissipation of pressure. Pressurisation may be accomplished by an evaporator and dissipation of pressure may be accomplished by a condenser or by respectively circulating through heat exchange means in the working fluid first heated fluid from the external heat source and then cool fluid from the external cooling means of the temperature modifer. After a predetermined period, the dwell time may be completed and the power stroke associated with the first and second expansion chambers executed with a maximum differential pressure existing between the expansion and opposed compartments of the respective first and second expansion chambers.

The dwell time may be achieved by locking the rocker arrangement in a particular toggle position at the end of each part of a stroke cycle. Alternatively, the dwell time may be achieved by closing one way valves interposed between the pressure intensification means and the accumulator to effectively lock the first and second converter walls in a particular position. In another arrangement, a pressure switch may be used to gauge when each expansion chamber reaches a predetermined pressure level, whereby to then activate the cylinder or solenoid holding the toggle arrangement in position thereby commencing a new part of the stroke cycle.

The first and second opposed compartments may be vented and in communication with air at ambient pressure. The first and second opposed compartments may be in communication with a collector vessel in a closed system. The collector vessel may be maintained at roughly atmospheric pressure and may be effective to return pressure back to the first and second converter compartments to reduce the effect of any leakage through seals associated with the fist and second converter walls.

The movable wall may be a piston including a shaft adapted to travel through an aperture in an end wall of the first converter chamber. The aperture may include seal means to reduce undesirable leakage of the working fluid from the first converter compartment through the aperture or the seals associated therewith. The seal means may include a sleeve to encapsulate the shaft adjacent the aperture. The sleeve may be concertinaed and may be in the form of bellows adapted to guard against pressure leakage.

If required, an alternating current regeneration with active correction unit to provide a frequency correction interface can be included in the to interface with the work output system. The unit may be interposed between the generator or alternator and the work output system. This is important where the consistency of the power generated is critical, such as the powering of appliances requiring an electricity power supply equal to that of mains power, although for many applications such a unit will be unnecessary. The units may be effective to regulate the generator or alternator 52 (for example to maintain at 1500 r.p.m.) and the frequency generated (for example to maintain at 50 Hz). Such units are commercially available, for example from Siemens Masterdrive.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DETAILED DESCRIPTION OF THE DRAWINGS

Figure 1:
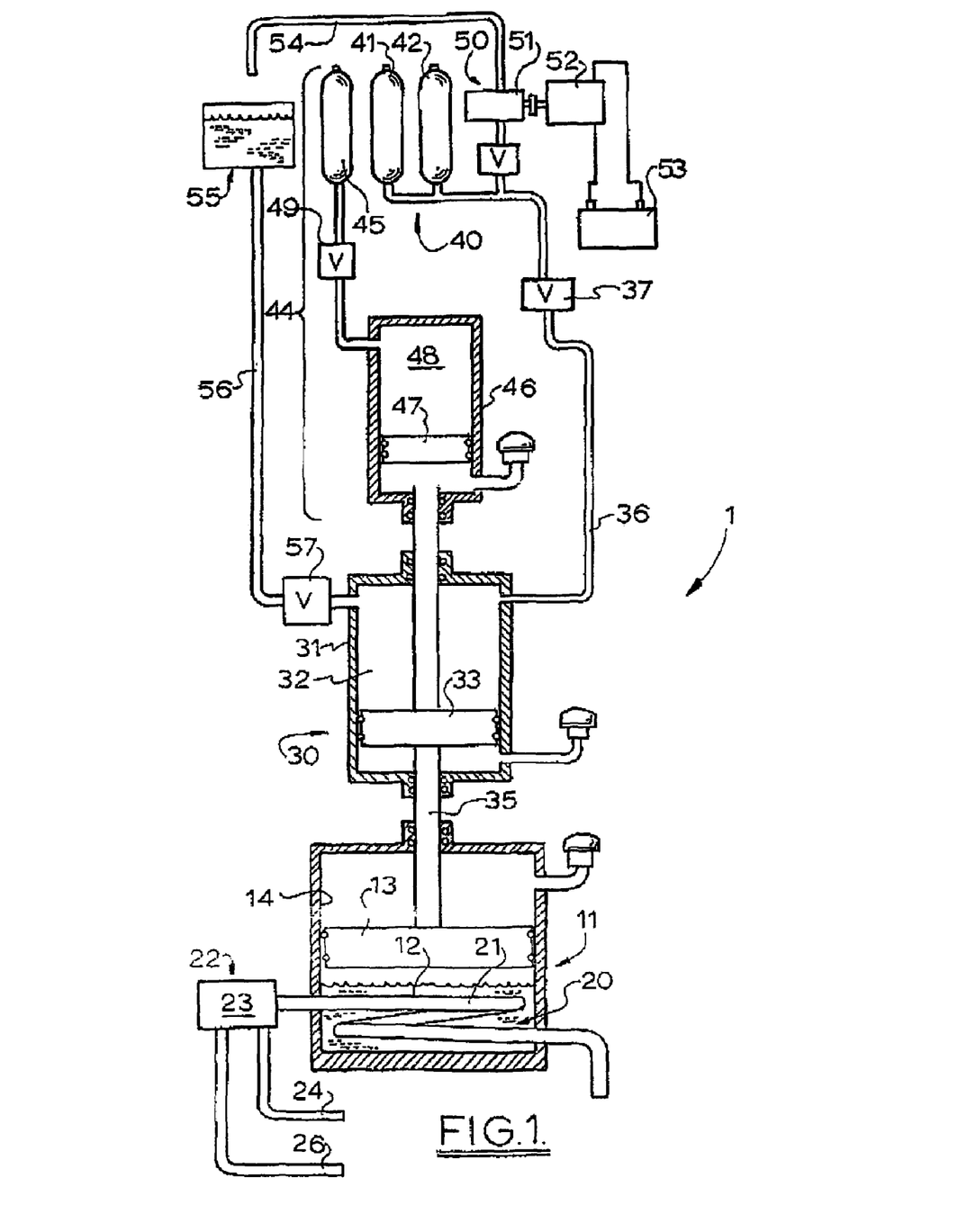
FIG. 1 is a schematic side sectional or view of an engine and associated apparatus in accordance with a first embodiment.

Referring to FIG. 1, an engine 1 includes an expansion chamber 11 and associated heat exchange means 20 for alternately heating and cooling working fluid in the form of a refrigerant 12 in the chamber 11. The upper wall of the closed chamber 11 is defined by the piston 13 which is movable vertically within the chamber 11 in response to changes in pressure of the alternately heated and cooled refrigerant 12.

As the temperature of the refrigerant is increased, the pressure within the chamber 11 increases, substantially forcing the piston 13 upwards to expand the volume of the chamber 11. Conversely, if the temperature of the refrigerant 12 is decreased, the pressure in the chamber 11 decreases.

The engine 1 includes compression means 30 coupled to the piston 13 for compressing a storage fluid 32 located within a compression cylinder 31. The piston 33 which is moveable in the compression cylinder 31 is coupled by a shaft 35 to the piston 13 in the chamber 11 so as to be moved by movement of the piston 13.

When compressed by piston 33, the storage fluid 32 flows to an accumulator means 40 for holding the pressurised storage fluid 32 at an elevated pressure and at progressively increasing pressure as the compression means 30 cycles in response to cyclical movement of the piston 13 of the expansion chamber 11.

Associated with the accumulator means 40 is a controlled work output system 50 for utilising the storage fluid 32, representing energy stored as hydraulic fluid pressure, to perform useful work. Whereas the process of accumulating the stored energy in the accumulator means may involve irregular and inconsistent stroke cycles of the piston 13, the stored hydraulic pressure can be released in a controlled manner. The work output system 50 includes a hydraulic motor 51 coupled to an alternator or generator 52 to generate electrical power, which can be used for example to charge, electrical batteries 53 or by controlled release of stored pressurised hydraulic fluid from accumulators, will maintain constant revolutions of the hydraulic motors coupled to the generator or alternator 52 thereby producing a fixed frequency and voltage output to be fed directly to an electrical grid or to a customer. If required, frequency inverts cm be used to maintain constant frequency or voltage. An alternating current regeneration with active correction unit can be included, interposed between the generator or alternator 52 and the work output system 50. The units may be effective to regulate the generator or alternator 52 (for example to maintain at 1500 r.p.m.) and the frequency generated (for example to maintain at 50 Hz). It is also possible to have multiple cylinders with pressure release valves to regulate hydraulic flow; and to run hydraulic motors directly without accumulator.

To further explain, the piston 13 in the expansion chamber 11 as illustrated is at or near the end of its return stroke at the end of a cooling cycle or about to begin a heating and compression cycle. The engine 1 includes an hydraulic fluid accumulator 45 which is part of a piston return mechanism 44 operative to return the pistons 13,33 at the end of a heating and compression cycle when the storage fluid 32 has been compressed and supplied to the accumulator means 40.

The accumulator 45 is coupled to a piston return cylinder 46 in which there is a piston 47 coupled to piston 33 of the compression means 30. At the start of and during the return cycle of the pistons 13,33, the elevated pressure of hydraulic fluid 48 within the upper portion of the cylinder 46 supplied from the pressure accumulator 45 acts on the piston 47 to return the pistons 13,33. Conversely, during the compression stroke the piston 47 is moved upwardly in the cylinder 46 to elevate the pressure of the hydraulic fluid 48 which is returned through valve 49 to the pressure accumulator 45.

As a more simple alternative to the piston return means 44, where possible a compression spring may be provided within the cylinder 31 acting on the upper face of the piston 33, the spring being operative to apply downward force to return the piston 33 and piston 13 during the return cooling stroke or cycle of the engine 1.

The heat exchanger means 20 provided in the expansion chamber 11 which is operative to alternately heat and cool the working fluid 12 has an associated means 22 for cycling the fluid heating and fluid cooling functions. The cycling means 22 is illustrated as a two-way valve 23 (and associated timing or switching mechanism—not shown) which is operative at or about the point in the cycle illustrated in FIG. 1 to open to allow heating fluid to enter the heat exchange coil 21 from the heating fluid inlet 24. The flow of heating fluid from the inlet 21 through the cycling means 22 and the heat exchange coil 21 raises the temperature of the working fluid 12 within the chamber 11.

If the working fluid 12 for example comprises a refrigerant such as refrigerant type R409a, and the temperature of the refrigerant was raised to 42° C., the pressure of the heated refrigerant would be 935.9 kPa (137 psi). If the diameter of the piston 13 is, say, 304 mm (12 inches) the surface area of the piston would be 113 square inches providing a force of 15494 lbs acting on the lower fee of the piston 13. With the piston 13 coupled as shown in FIG. 1 to the piston 33 of say, about 4 inches diameter, the piston 33 can create an hydraulic force of perhaps 2000 psi to act on the storage fluid 32 in the cylinder 31.

When the pistons 13 and 33 have reached the tops of their strokes and the storage fluid 32 has been expelled from the cylinder 31 through line 36 to the accumulator means 40, various valves can be switched as required to commence a cooling return stroke. In particular, the valve 37 in output line 36 can be closed, and the valve 57 through which low pressure hydraulic fluid can be returned to the cylinder 31 is opened to allow hydraulic fluid from storage reservoir 55 to flow through line 56 to refill the cylinder 31 as the piston 33 moves downwardly. To promote or assist the return of the pistons 13,33 in their respective cylinders 14, 31, pressurised hydraulic fluid in accumulator 45 can flow through valve 49 to the piston return cylinder 46 to urge the piston 47 downwardly. At substantially the same time, the two way valve 23 is switched to pass cooling fluid from inlet 26 into the heat exchange coil 21 so as to cool the refrigerant 12 within the chamber 11. If the refrigerant is K409a, the temperature of the refrigerant 12 is reduced to 18° C. and the pressure drops to 418.9 kPa (61.57 psi). When pistons 13, 33, 47 have reached the bottoms of their strokes, the valve 57 is closed because cylinder 31 is now charged with new hydraulic fluid, valve 37 is opened, and two-way valve 23 is switched again to admit heating fluid to the heat exchange coil 21.

The heating and cooling fluids supplied respectively through inlets 24,26 may be obtained from any convenient sources. Because the temperature to which the refrigerant 12 is heated can be relatively low (42° C. in the example), the possible sources of heating fluid can include solar energy fluid heaters, waste gas emissions from vehicles, generators, industrial plants and equipment, geothermal sources etc. The exhaust gases may be passed through the heat exchange coil 21 directly. Alternatively, water heating coils can be passed in heat exchange relationship to exhaust pipes, chimneys, or the like caring the heated gases so that the water is heated thereby and the heated water is used as the heating fluid passing through the coil 21 in the engine. Of course, the hot gases themselves can be utilised directly as the heating fluid as shown if FIG. 2A. Likewise, the cooling fluid passed through the coil 21 during the cooling return cycle can be any suitable or conveniently available cooling fluid, such as cool or cold water from any convenient available source, such as natural or artificial streams, ponds, or other bodies of water.

Figure 2A:
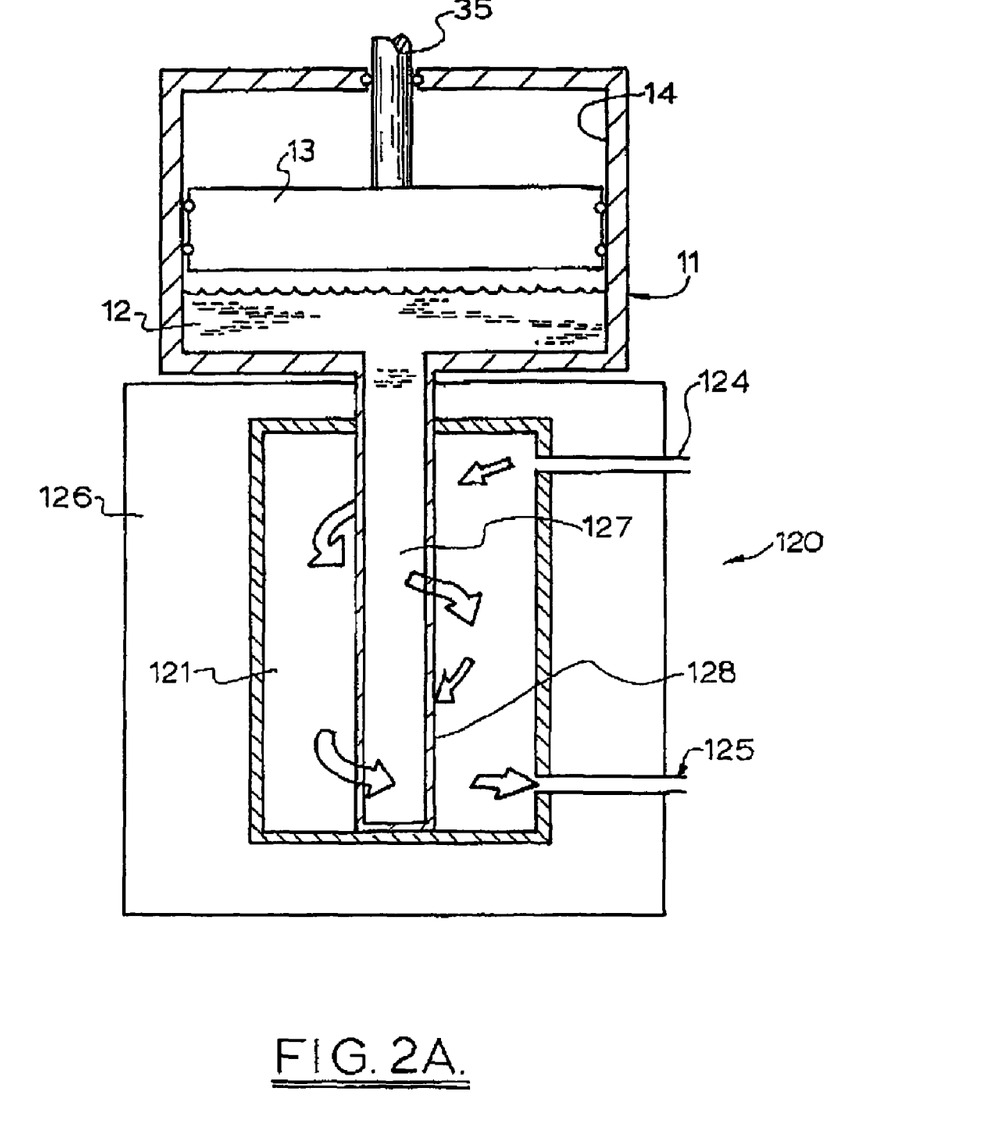
FIG. 2A is a schematic side sectional view of an alternative fluid heat exchange and expansion chamber arrangement.

In the modified embodiment illustrated in FIG. 2A, the heat exchange means 120 is substantially separate from the chamber 11 although the working fluid 12 is in direct communication with the chamber 11. In this embodiment, the heat exchange means 120 includes a thermal fluid chamber 121 having an inlet 124 through which heating fluid and cooling fluid are alternately introduced under control of a cycling means such as the cycling means 22 in the embodiment of FIG. 1. The heating fluid and cooling fluid pass through the thermal fluid chamber 121 and exit through outlet 125. The chamber 121 is substantially totally enclosed within an insulating jacket 126 to reduce thermal losses through the outside walls of the chamber 121. Also the outside wells of the chamber 121 may be relatively thin material to reduce thermal load losses in alternately heating and cooling the walls. As well as thin metallic walls, the walls could be non-metallic. e.g. ceramic or alumina material to have low heat conductivity.

Located centrally within the chamber 121 is a side chamber 127 of the expansion chamber 11, the side chamber 127 being in communication with the expansion chamber 11 so as to be filled with the working fluid 12. The side chamber 127 has highly heat conductive walls 128 so that heat from heating fluid passing through chamber 121 from inlet 124 to 125 is rapidly supplied to the working fluid 12 within the chamber 127. This in turn will cause the desired rise in pressure in the expansion chamber 11 to move the piston 13 during the heating and storage fluid compression stroke. Conversely, when cooling fluid is being passed through inlet 124, through the chamber 121, and out of outlet 125, the heated working fluid 12 in the side chamber 127 rapidly yields up heat through the walls 128 to the cooling fluid to reduce the pressure in the expansion chamber 11 acting on the underside of the piston 13 during the cooling return stroke.

It will be seen that the engine is relatively simple in operation and many of the components can be readily available existing types of equipment. The construction, assembly, installation, operation and maintenance of the engine and associated equipment can be relatively simple, and operators and maintenance personnel need not be highly educated and trained personnel since the technology is relatively simple.

Figure 2B:
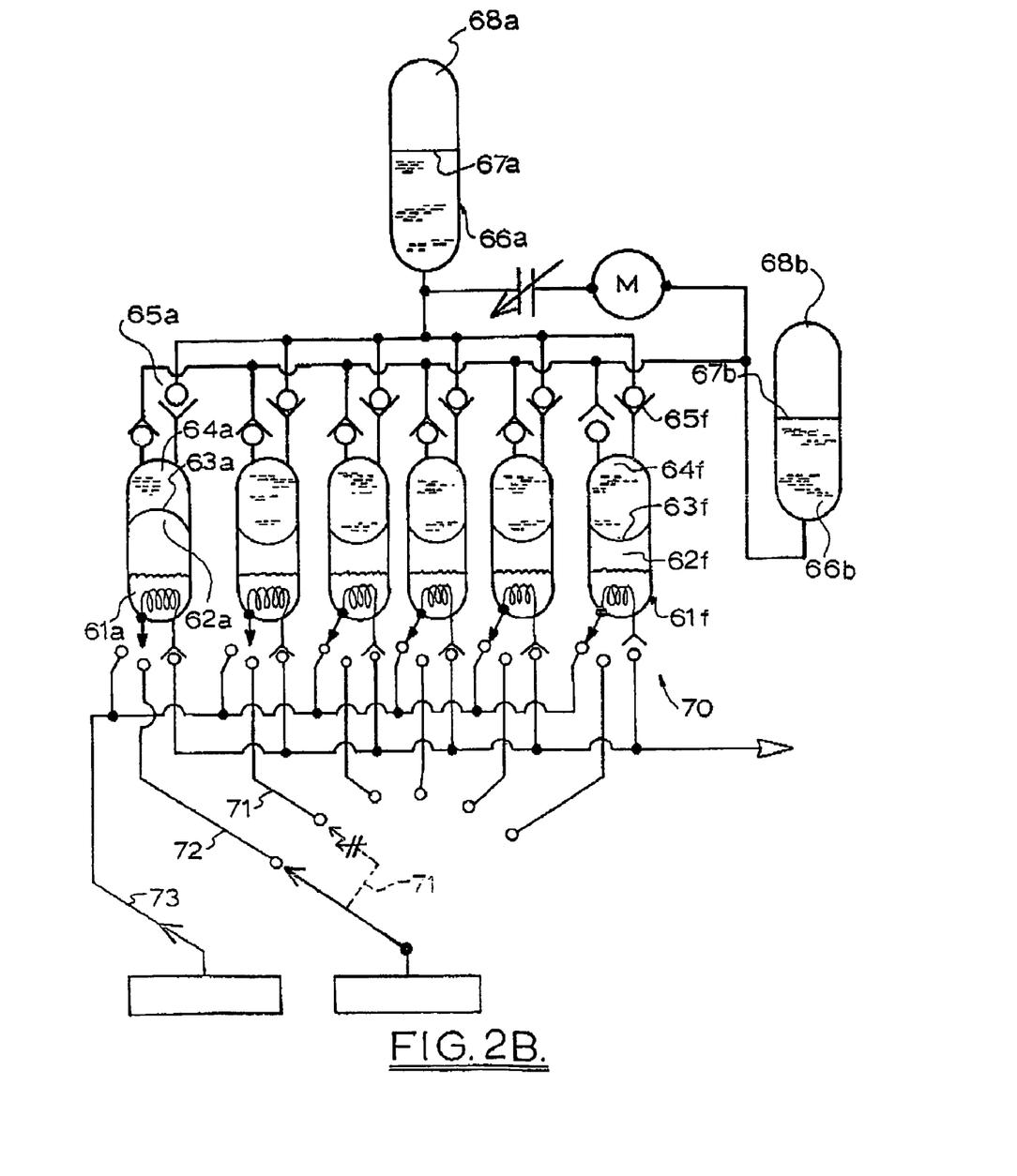
FIG. 2B is a schematic side sectional view of another alternative fluid heat exchange and expansion chamber arrangement.

In FIG. 2B an alternative engine 60 to the embodiment shown in FIG. 1 is shown. The engine 60 includes a plurality or battery of thermal conversion cylinders 61*a–f* including corresponding expansion chambers 62*a–f*. Instead of the expansion wall of each expansion chamber 62*a–f* being a rigidly formed piston as in FIG. 1, the expansion wall is a a flexible bladder or membrane 63*a–f*. Instead of having separate pressure storage means, the thermal expansion cylinders 61*a–f* play a duel role of providing the expansion chamber 62*a–f* as well as the pressure storage means 64*a–f* on the opposed side of the flexible membrane 63*a–f* in the thermal expansion cylinders 61*a–f*. By heating and cooling the working fluid inside the accumulator/converters 61*a–f*, external condenses, evapourators, and pumps are not necessary in this arrangement. The pressure storage means 64*a–f* contains storage fluid in the form of hydraulic fluid which is in communication, via valves 65*a–f*, to accumulator means 66*a*. The storage fluid in accumulator 66*a* is maintained at an extremely high pressure of about 3000 p.s.i and is continually bled at a low late whereby to power a motor M. The storage fluid is recycled via return accumulator 66*b* which maintains the storage fluid at about 250 p.s.i. to provide a return stroke facility for the engine 60. The accumulators 66*a,b* have a similar flexible membrane 67*a,b* through which a second compartment 68*a,b* contains variously pressurised nitrogen gas. The accumulator oil refill should be automatic due to there being a constant cooling fluid temperature whereby to produce maintain the return fluid in accumulator 66*b* at about 250 p.s.i. In contrast, the storage fluid in accumulator 66*a* is maintained consistently at a pressure of about 3000 p.s.i. The expansion chambers 62*a–f* are supplied with alternating hot and cold fluid by lines 69*a* and 69*b*, respectively, interposed a plurality of valves 70. The hot fluid may alternatively be preheated via an optional route 71 or, if a ready sufficently hot fluid source is available, this available hot fluid may be used directly as represented by lines 72. It is clearly preferable from a cost viewpoint to utilise any available direct hot fluid source 72. The hot fluid sources 71, 72 can be pressure switched. For example, when the working fluid in one of the expansion chambers 62*a–f* reaches a predetermined pressure, the pressure switch ma) case the hot fluid supply 71, 72 to switch to the next cylinders 61*a–f*. The engine also includes a cool fluid source 73. The cool fluid source 73 may be series connected to an existing plant where available. It will be appreciated that the more expanding working fluid pressure switched condensers, ultimately the better the flow pulse supply of the storage fluid from the pressure storage means 64*a–f* to the accumulators 66*a,b*.

The operation of the valves 70 are controlled, either by pressure switching as mentioned above, or by a computer system timed to correspond to the stroke cycle of each of the accumulator converters 61*a–f*. The pressure of the working fluid may vary between about 200 p.s.i. at the end of the cooling part of the stroke cycle to 820 p.s.i. at the end of the heating part of the stroke cycle. The accumulation of pressure in the storage fluid in the accumulator 66*a* is thus able to be maintained at about 3000 p.s.i. due to the additive effect of the combination of the operation of the accumulator/converters 61*a–f* and the rate of bleeding off of the storage fluid to power the motor M.

Figure 3:
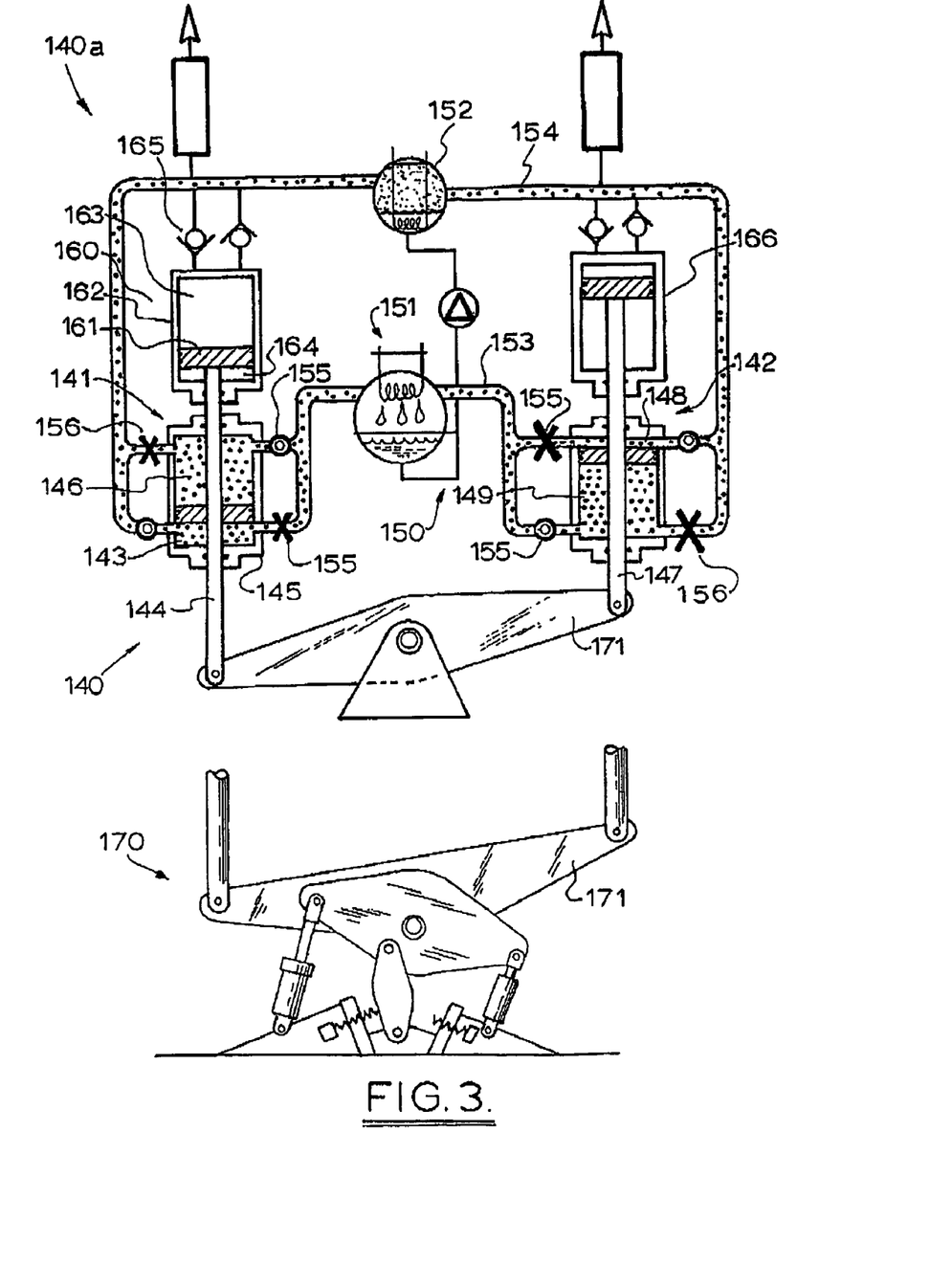
FIG. 3 is a schematic cross-sectional view of a thermal engine according to a fourth embodiment.

Turning to FIG. 3, there is shown a thermal energy converter 140, a temperature modifier 150, a pressure intensification moms 160 and a rocker arrangement 170, being components of an engine 140*a* for converting thermal energy. The accumulator 40 and controlled output means 5 of the engine 140*a* are as described in relation to the embodiment of FIG. 1.

The thermal energy converter 140 includes a first expansion chamber 141 and a second converter chamber 142. The first converter chamber 141 houses a piston 143 adapted for linear reciprocal travel within the first converter chamber 141. A first shaft 144, extends axially either side of the first piston 143, is fixed relative to the piston 143 and extends through apertures in the opposed ends of the cylindrically shaped first converter chamber 141. The piston 143 divides the first converter chamber 141 into two compartments, the first expansion compartment 145 which varies in volume in inverse relation to the volume of a first opposed converter compartment 146 in the first converter chamber 141.

Co-axially fixed to the first shaft 144 is a first pressure piston 161 housed in a first pressure chamber 162. A similar mirror image arrangement may be seen in relation to second pressure chamber 166. The first pressure chamber 162 defines, together with the first pressure piston 161, first pressure compartment 163 and first opposed pressure compartment 164. First opposed pressure compartment 164 is vented to the atmosphere. First opposed pressure compartment 163 is in communication with the accumulator means 40 described in relation to FIG. 1 via a pair of inlet/outlet valves 165.

The temperature modifier 150 includes a condenser 151 and an evaporator 152 in communication with the first and second converter chambers 141, 142 via separate lines: condenser line 153 and evaporator line 154. The inline condenser 151 includes a coil which extends through cool fluid, such as water from a local stream or another cool water source which flows to cool the working fluid in condenser line 153. The evaporator 152 also includes a coil through which hot fluid, such as hot water or gas from a local source, flows to heat the working fluid in evaporator line 154. The working fluid is refrigerant AZ20. Inline evaporator and condenser valves 155, 156 are located inline the condenser and evaporator lines 153, 154.

The second converter chamber 142 and the second pressure chamber 166 are reflectively the mirror image of first converter chamber 140 and first pressure chamber 160, respectively. Accordingly, extending through the second converter chamber 142 and into the second pressure chamber 166 is a second shaft 147 attached at a second end to a rocker 171. Similarly, the lower end of the first shaft 144 is pivotably attached to a first end of the rocker 171. In the lower portion of FIG. 3, the rocker arrangement 170 is shown and is shown in greater detail in FIG. 4. The rocker arrangement 170 includes rocker 171 adapted to pivot about pivot point 172. The pivoting of rocker 172 is controlled by a co-axially pivotal toggle bracket 173 whose pivoting action is controlled by an over-centre arrangement 174 which, together with a pair of hydraulic cylinders 176 pivotally extending from a base 175 to an end each of the toggle 173, enables the rocker arrangement to be locked into position until the pair of cylinders 176 are again activated. Screw bolts 177 are threaded into the base 175 to provide adjustable stops limiting the extent of travel of the overcentre 174. By this mechanism, a dwell time is achieved for the engine of FIG. 3 or 4 whereby to permit pressure build up of the working fluid in complementary compartments of the first and second converter chambers 141, 142. This optimises the pressure differential between the first and second expansion compartments and the first and second opposed converter compartments to maximise the power strokes associated with each of the first and second converter chambers. Note that the power stroke in the arrangement shown in FIG. 3 is effected in both the first and second converter chambers 141, 142 simultaneously, whereas in the arrangement shown in FIG. 4, she first and second opposed compartments 136 are vented to the atmosphere or to a pressure collector, whereby each converter chamber provides a power stroke every alternate part of the stroke cycle.

Figure 4:
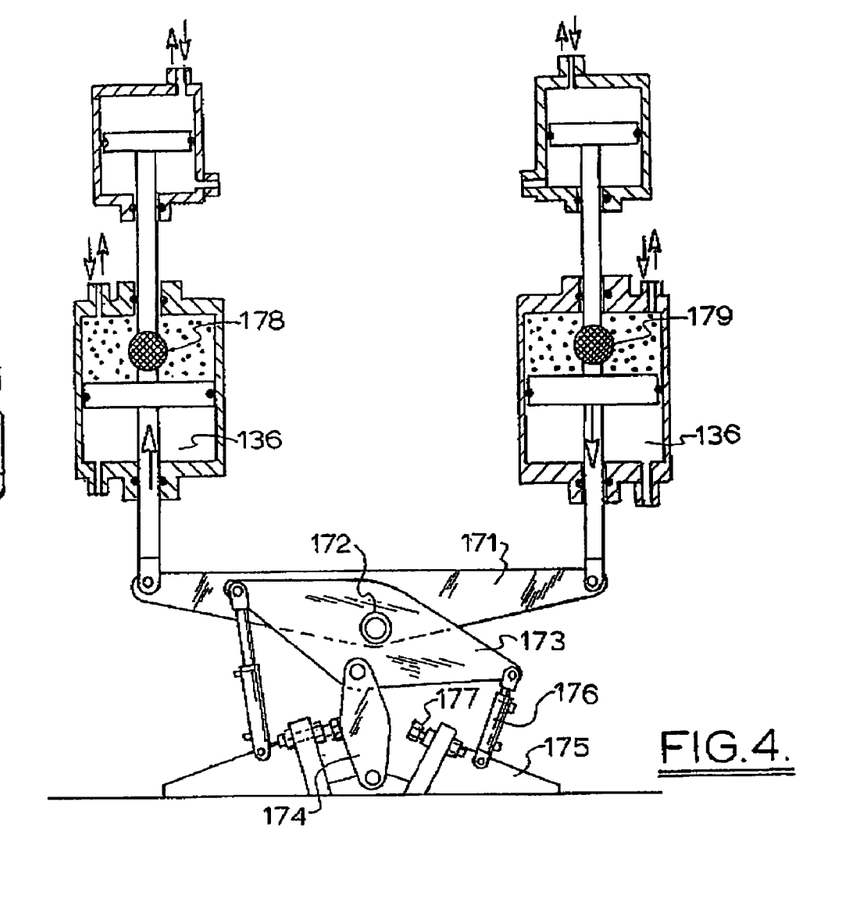
FIG. 4 is a schematic side view of the fourth embodiment showing a rocker arrangement with more clarity.

Whereas the arrangement of FIG. 3 is considered to produce greater power compared to that of FIG. 4, it is also less efficient in its use of the available energy as the resistance provided by the opposing compartment during a power stroke must overcome the ambient pressure of the refrigerant to effect the power stroke. However, both chambers may perform the power stroke at the same time.

With particular reference to FIG. 3, in a first part of the stroke cycle, first expansion compartment 145 is cooled to lower the pressure to the ambient pressure of the refrigerant, that is about 200 psi, whilst dwell time achieved by locking rocker amazement 170 permits the pressurisation of the first expansion compartment 145 as well as the corresponding second opposed converter compartment 148. This is achieved by opening the evaporator valves 156 to the second opposed converter compartment 148 and the first expansion chamber 145 and closing the condenser valves 155 so that the working fluid achieves pressures of between 500 and 800 psi in these compartments 145, 148, whereas the first opposed converter compartment 146 and a second expansion compartment 149 are cooled by exposure of the working fluid in line 153 to the cooling fluid of the condenser 151. Evaporator line 154 and condenser line 153 both include small piston pumps adapted to circulate the working fluid through lines 153,154. The piston pumps (not shown) require minimal energy and may therefore involve a separate feed line from the accumulator or be driven by a battery charged by the work output means or directly from generator or alternator output.

In FIG. 4 it is clearly shown that the first and second converter chambers are pivotable about fist and second pivot points 178, 179 to ensure that the first and second shafts 144, 147 follow the curved path caused by their pivotal attachment to the rocker 171.

Figure 5:
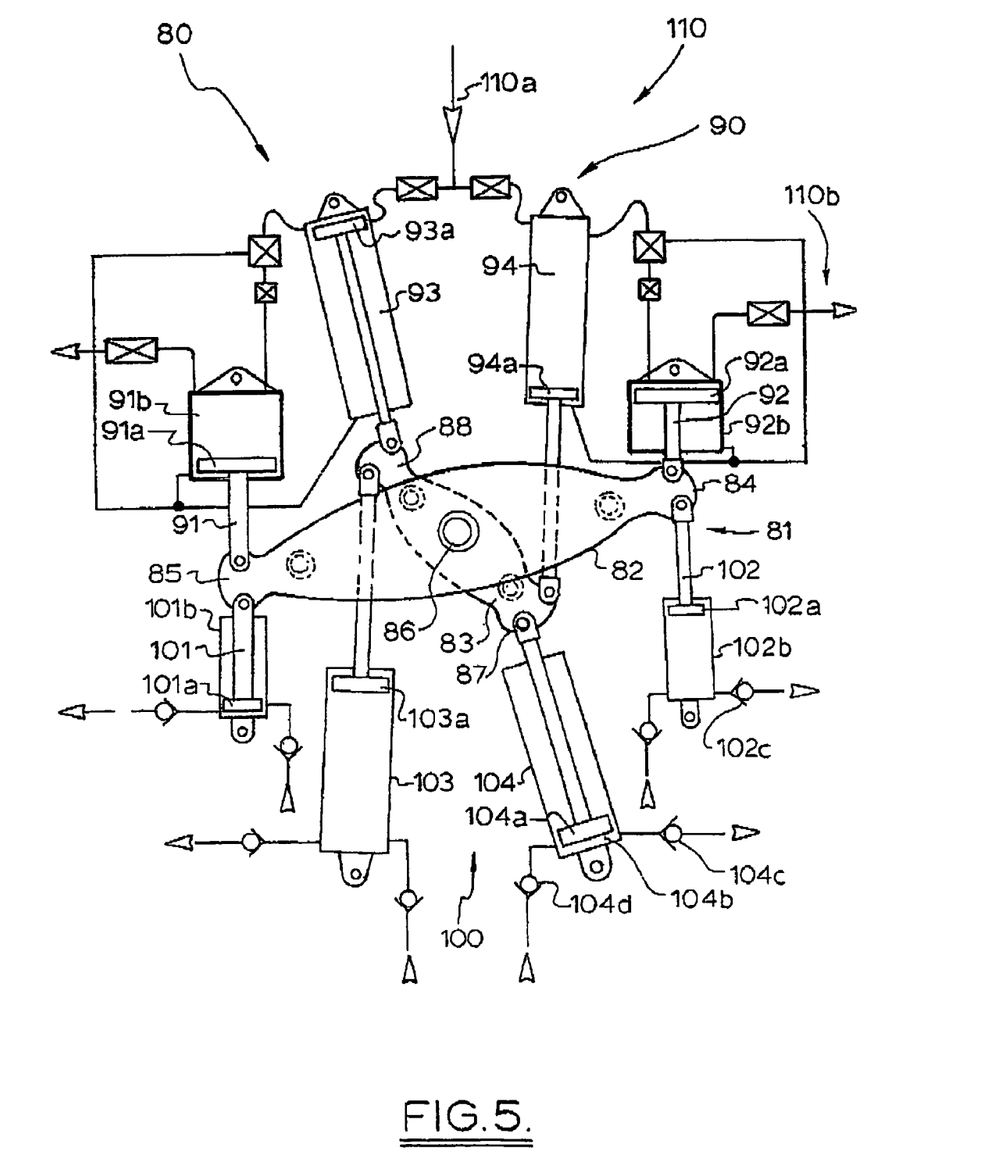
FIG. 5 is a schematic side sectional view of a thermal engine including an alternative rocker arrangement according to a fifth embodiment.

In FIG. 5 there is shown a double expansion double rocker arm arrangement 80 comprising a double rocker arm arrangement 81, expansion means 90, accumulator means 100 and heating/cooling means 110.

The double rocker arm arrangement 81 includes a large rocker arm 82 coaxially and pivotally associated with a second smaller rocker arm 83. The large and small rocker arms 81, 82 are adapted to pivot in opposed relative relationship about their common axes of rotation 86. The large rocker arm 82 includes a pair of opposed ends, a first end 85 and a second end 84, whereas the small rocker arm 83 includes a first end 88 opposed to a second end 87. In operation, the respective first ends 84, 87 reciprocally rotate in opposite directions. Similarly, the respective second ends 85, 88 reciprocally rotate in opposite directions relative to one another. The first large end 85 is pivotally engaged to a pair of piston arms 91, 101 rigidly connected to respective pistons 91A, 101A. The piston 91A reciprocates in a cylinder 91B. The piston arm 101 is rigidly connected to a piston 101A which operatively reciprocates in an accumulator cylinder 101B.

On the opposition second end 84 of the large rocket am 82 a pair of piston arms 92, 102 are pivotally mounted and are rigidly connected to corresponding pistons 92A and 102A. Piston 92A is operative to reciprocate in an expansion cylinder 92B whereas piston 102A is positioned to reciprocate within an accumulator 102B. Similar complementary thermal converter cylinder and accumulator cylinder arrangements are shown in the illustration of FIG. 5 whereby there is a provided a pair of thermal converter cylinders 93 and 94 pivotally connected by their respective pistons 93A and 94A to the first and second ends 88, 87, respectively, of the smaller rocker arm 83. Furthermore, accumulators 103, 104 are pivotally connected to the small rocker arm 83 at its respective first and second ends 88, 87 via pistons 103A and 104A. In operation, it can be seen that, as illustrated, hot working fluid is admitted to converter 94 from an evaporator 110A to perform a power stroke in which the piston 94A forces the second small end 87 downwardly. This downward movement causes the piston 104A to compress the storage fluid 104B in the accumulator 104. This pressurised storage fluid 104B is released by a valve 104C to final accumulation means such as accumulator means 40 described with reference to FIG. 1. On the return stroke, the heated working fluid from converter 94 is delivered to converter 92B causing a downward stroke of the second end 84 of the large rocker arm 82, in turn causing a downward stroke of piston 102A in accumulator 102B to provide a further charge of pressurised storage fluid in the form of hydraulic oil via valve 102C. During this return stroke, the working fluid in converter 94 is cooled to cause piston 94A to withdraw upwardly dragging the smaller rocker arm 83 and the piston 104A upwards, whereby recycled non-pressurised hydraulic oil 104B may be admitted to accumulator 104 via a oil inlet valve 104D.

It can be seen that the stroke length of the pistons 93A, 94A, 103A, 104A, are the same and the piston cross sectional areas are also the same. Conversely, whilst the respective volumes of the accumulators 91B, 93, 94, 92B are the same whereby to admit the transfer of heated working fluid from accumulators 93, 94 respectively to accumulators 91B, 92B, the stroke lengths of the pistons 91A, 92A, 101A, 102A are much shorter than the stroke lengths of pistons 93A, 94A, 103A, 104A, the cross sectional areas of pistons 91A, 92A are significantly greater than the cross sectional areas of pistons 101A, 102A to provide a pressure intensification factor. For example, the stroke length of piston 93A may be 22 inches (55 cm) and the cross sectional area of piston 93A, 6 inches (15 cm). Conversely, the stroke length of piston 91A may be about 10 inches (about 25 cm), its diameter about 4 inches (about 10 cm), whereas the diameter of piston 101A may be about 5 inches (about 13 cm). By this arrangement, a storage fluid pressure of, for example, 3000 p.s.i. can be maintained. The pressure of the working fluid in each expansion means can vary between 820 p.s.i. and 200 p.s.i.

Figure 5A:
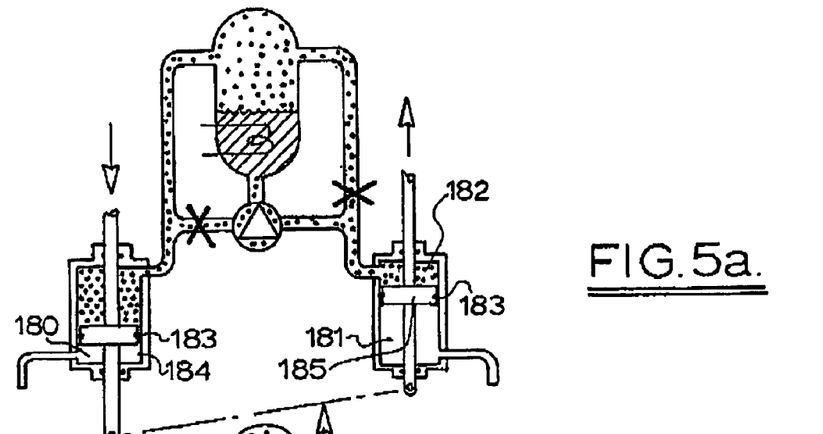
FIGS. 5A, B and C are schematic sectional side views of a thermal engine according to a sixth embodiment showing the expansion chamber in various stages of a stroke cycle.
Figure 5B:
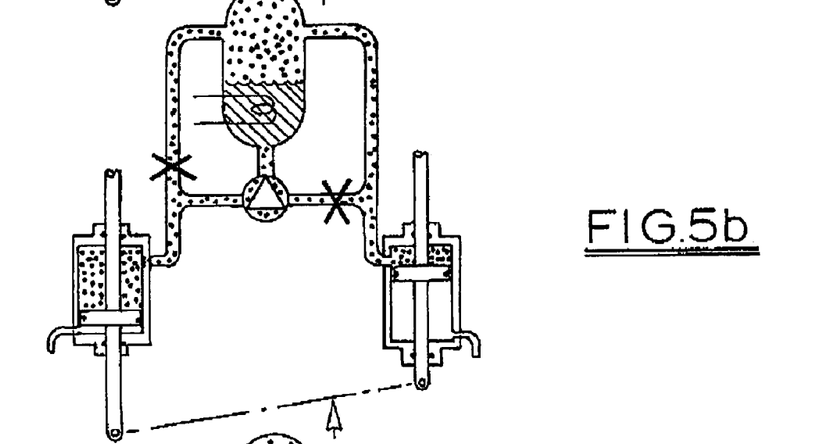
Figure 5C:
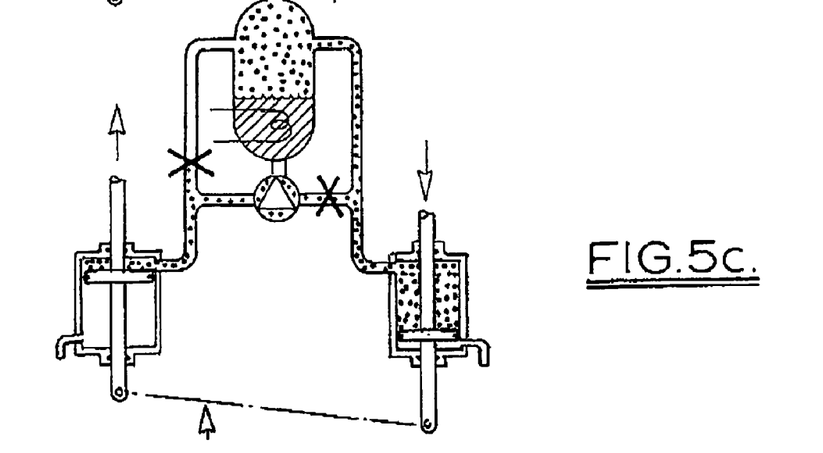
Figure 6A:
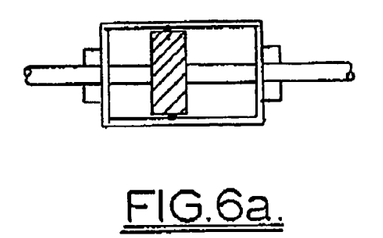
FIGS. 6A and 6B are schematic side sectional views of an expansion chamber according to the first embodiment, augmented by sealing means.
Figure 6B:
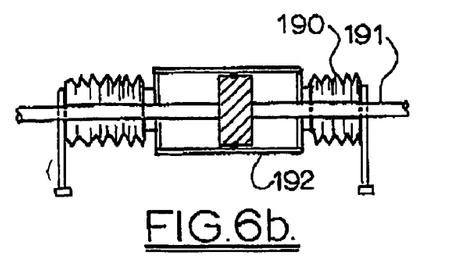

In FIGS. 5A, B and C there is shown an alternative arrangement in which the first and second opposed converter compartments 180, 181 are vented to the atmosphere or are in communication with a pressure collector vessel which is adapted to feed escaped pressure back into the working fluid system 182. In this regard, leakage is likely to occur through the annular seas 183 about the pistons 184, 185. Shown in FIGS. 6A and B are bellows 190 which are in the form of concertinaed sleeves surrounding sections of the shaft 191 either side of the converter chamber 192. The bellows 190 may be in communication with pressure collector vessel (not shown) to reduce pressure loss from the overall system.

Figure 7A:
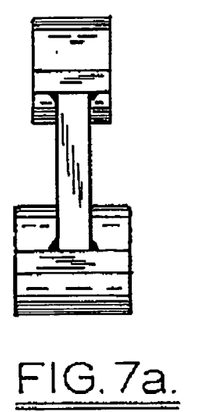
FIGS. 7A and 7B are schematic side sectional views demonstrating the intensification factor in relation to various of the described embodiments.
Figure 7B:
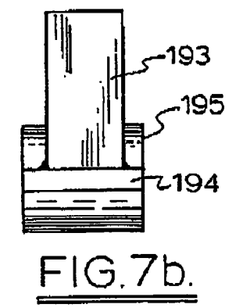

Referring to FIGS. 7A and B, the schematic diagrams illustrate how pressure intensification is achieved in the transition from the expansion compartment corresponding to a relatively large Area "Y" to the smaller piston head of the pressure intensification means (Area "X"). In FIG. 7B, a central cylindrical column 193 is located on the single piston head 194 and the pressure chamber 195 corresponds to the opposed converter compartment, such that the thermal energy converter and the pressure intensifier are housed in a single chamber. In each example shown, a pressure intensification factor of 3 is achieved by different thermal engine converter/pressure intensifier combinations.

Figure 8:
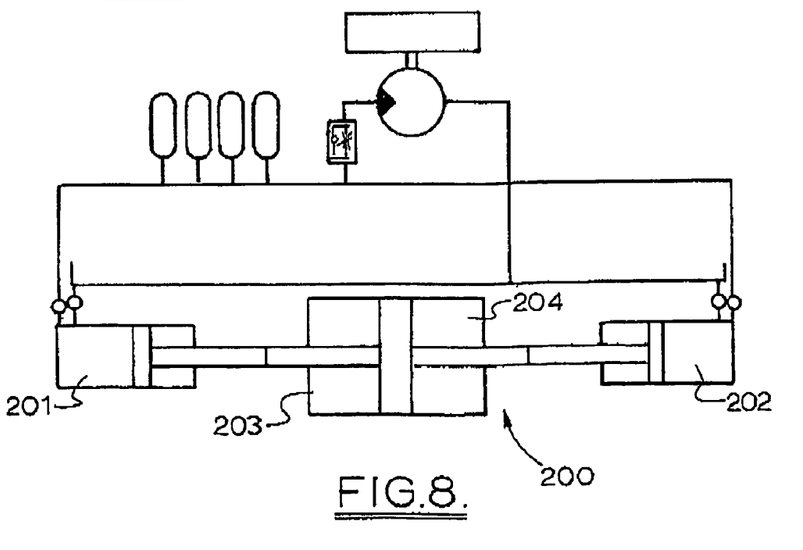
FIG. 8 is a schematic sectional side view of a seventh embodiment of the invention.

In FIG. 8 there is shown a generator arrangement comprising a thermal energy converter 200 interposed between a pair of pressure chambers 201, 202, whereby each part of the power stroke cycle of converter 200 alternately charges a different pressure chamber 201, 202. In such an arrangement, provision of a dwell time is desirable to achieve optimum pressure differential between converter compartments 203, 204.

There are obviously many variables in the arrangement of the engine that affect performance parameters including the respective piston areas, the strokes of the respective pistons, whether one directly couples pistons as shown using shaft 35 or whether indirect coupling, e.g. through leverage to magnify pressures, is used, the number of cycles of heating and cooling achievable, the temperatures to which the working fluid is heated and cooled, and the nature of the refrigerant working fluid. It is also possible to have multiple expansion chambers 11, multiple associated heat exchange means 20, and multiple compression means 30 operating out of phase with each other in parallel so that substantially continuous flow of pressurised hydraulic fluid occurs instead of the intermittent flow to the accumulator means 40 that occurs in the single cycle engine 1 illustrated in FIG. 1. The pressurised storage fluid 32 being output in line 36 is preferably passed directly to the hydraulic accumulators 41, 42 so that these accumulators store the hydraulic fluid at high pressure. The hydraulic fluid can be released in a controlled manner at a constant flow rate to the output system 50. It will be seen also that the engine can use heating and cooling sources available at many places around the world including over great ranges of climates since it is the temperature differential between the temperature to which the working fluid is heated and to which it is cooled that determines the possible work output rather than the absolute values of those temperatures. Also, the engine can be particularly environmentally acceptable since combustion of fuel is not necessary for its operation and/or sources of heat that is currently being wasted or lost (e.g. in heated exhaust from engines and industrial plant and equipment) can be utilised to perform useful work.

It is to be understood that various alterations, modifications and/or additions may be made to the features of the possible and preferred embodiment(s) of the invention as herein described without departing from the spirit and scope of the invention.

What is claimed is:

1. An engine for converting thermal energy to stored energy, the engine including:
   (a) a thermal energy converter including an expansion chamber which is adapted to vary in volume by the movement of a movable wall forming one part of said expansion chamber, said expansion chamber capable of performing an expansion-contraction cycle;
   (b) a working fluid in said expansion chamber which expands upon being heated whereby to displace the movable wall in a first direction to expand the volume of said expansion chamber and contracts upon being cooled to displace the movable wall in an opposed direction to reduce the volume of said expansion chamber;
   (c) a temperature modifier adapted to draw on:
      (i) a heat source to heat the working fluid to expand the volume of the expansion chamber by the displacement of the expansion wall to increase the volume of said expansion chamber as a first expansion part of said cycle; and
      (ii) a cooling source to cool the working fluid to reduce the volume of the expansion chamber and to permit the return of the movable wall as a second part of said cycle; and (d) pressure storage means operatively associated with said movable wall and adapted to deliver pressurised fluid to an accumulator means, said accumulator means for storing said pressurised fluid at an elevated pressure, wherein said accumulator means is capable of being bled of said pressurised fluid at a predetermined rate such that the accumulated said elevated pressure is maintained at a minimum threshold level, irrespective of the irregularity of the movement of said movable wall.

2. An engine according to claim 1, wherein said heat source is an external source of fluid with a temperature above 39 C.

3. An engine according to claim 2, wherein said external source of fluid is a by-product or waste product of an industrial or mechanical process.

4. An engine according to claim 1, wherein the regularity and speed of the movement of said movable wall is influenced by the difference between the temperatures of said heating and cooling sources and the stage of said cycle.

5. An engine according to claim 1, wherein a first predetermined dwell time precedes each expansion part of said cycle.

6. An engine according to claim 1, wherein a second predetermined dwell time precedes each contraction part of said cycle.

7. An engine according to claim 1, wherein said pressure storage means includes a storage piston operatively coupled to said movable wall and further includes pressure intensification means whereby the surface area of said movable wall is greater than the surface area of said storage piston.

8. An engine according to claim 1, wherein said engine includes a plurality of thermal energy converters arranged in parallel to charge said accumulator means with said pressurised fluid.

9. An engine according to claim 8, wherein said plurality of thermal energy converters operate independently of one another.

10. An engine according to claim 8, wherein the operation of said plurality of thermal energy converters is coordinated to deliver a relatively consistent supply of pressurised fluid to said accumulator means.

11. An engine according to claim 10, wherein said plurality of thermal energy converters are controlled by pressure switch means to determine selectively the heating or cooling of said working fluid.

12. An engine according to claim 10, wherein each said movable wall of said plurality of thermal energy converters is in the form of a converter piston and is mechanically linked by a rocker arrangement to determine selectively the heating or cooling of said working fluid.

13. An engine according to claim 12, wherein said heating and cooling sources are sources of hot and cold fluid, respectively, and the delivery of said hot and cold fluid to said plurality of thermal energy converters is controlled by valve switching means to determine selectively the heating or cooling of said working fluid in each said converter.

14. An engine according to claim 1, wherein said working fluid is a refrigerant.

15. An engine according to claim 1, wherein said pressurised fluid is a hydraulic oil.

16. An engine according to claim 1, wherein said engine is adapted to power work output means by the process of bleeding said pressurised fluid to drive a generator or an alternator.

17. An engine according to claim 16, wherein said alternator generates alternating current suitable for powering work output means in the form of appliances adapted to be powered by mains electricity.

18. An engine according to claim 1, wherein said movable wall is a flexible membrane.

19. An engine according to claim 18, wherein said pressure storage means forms part of said thermal energy converter and said expansion chamber is one compartment of said thermal energy converter separated from said pressure storage means by said movable wall.

20. An engine according to claim 5, wherein a second predetermined dwell time precedes each contraction part of said cycle.

* * * * *